United States Patent
Adams

(10) Patent No.: US 12,506,540 B2
(45) Date of Patent: Dec. 23, 2025

(54) ESTABLISHING A COMMUNICATION SESSION USING A HANDSHAKE PROCESS WITH LIGHT SIGNALS

(71) Applicant: Maplebear Inc., San Francisco, CA (US)

(72) Inventor: Robert Russel Adams, Chicago, IL (US)

(73) Assignee: Maplebear Inc., San Francisco, CA (US)

(*) Notice: Subject to any disclaimer, the term of this patent is extended or adjusted under 35 U.S.C. 154(b) by 332 days.

(21) Appl. No.: 18/176,233

(22) Filed: Feb. 28, 2023

(65) Prior Publication Data

US 2024/0289856 A1    Aug. 29, 2024

(51) Int. Cl.
  *G06Q 30/06* (2023.01)
  *G06K 7/14* (2006.01)
  *G06Q 10/087* (2023.01)
  *G06Q 30/0601* (2023.01)
  *H04B 10/116* (2013.01)
  *H04L 15/04* (2006.01)
  *H04L 67/141* (2022.01)
  *H04N 23/63* (2023.01)

(52) U.S. Cl.
  CPC ......... *H04B 10/116* (2013.01); *G06K 7/1413* (2013.01); *G06K 7/1417* (2013.01); *G06Q 10/087* (2013.01); *G06Q 30/0613* (2013.01); *H04L 15/04* (2013.01); *H04L 67/141* (2013.01); *H04N 23/635* (2023.01)

(58) Field of Classification Search
  CPC .. H04B 10/116; G06K 7/1413; G06K 7/1417; G06Q 10/087; G06Q 30/0613; H04L 15/04; H04L 67/141; H04N 23/635
  See application file for complete search history.

(56) References Cited

U.S. PATENT DOCUMENTS

2011/0296508 A1* 12/2011 Os .................. H04L 63/0853
                                                        709/237
2013/0141555 A1*  6/2013 Ganick ............. G01S 5/0264
                                                         348/61

(Continued)

OTHER PUBLICATIONS

Bonini, T., Treré, E., Yu, Z., Singh, S., Cargnelutti, D., & López-Ferrández, F. J. (2023). Cooperative affordances: How instant messaging apps afford learning, resistance and solidarity among food delivery workers. Convergence, 30(1), 554-571. https://doi.org/10.1177/13548565231153505.*

*Primary Examiner* — Resha Desai
(74) *Attorney, Agent, or Firm* — Fenwick & West LLP

(57) ABSTRACT

An online concierge system for establishing a communication session between devices using a light signal. A first client device captures video data depicting a light emitter of another client device. The first client device detects a light signal transmitted by the light emitter in the video data. The first client device extracts a handshake identifier from the light signal by decoding the light signal. A machine learning model may be used to translate the light signal into a numerical or an alphanumerical identifier. The first client device established a communication session with the other client device by transmitting a request to establish the communication session via an online concierge system. The request contains the extracted handshake identifier.

17 Claims, 5 Drawing Sheets

(56) References Cited

U.S. PATENT DOCUMENTS

| | | | |
|---|---|---|---|
| 2014/0055553 A1* | 2/2014 | Lee | G06V 10/95 |
| | | | 348/14.07 |
| 2016/0379214 A1* | 12/2016 | Li | G06Q 10/083 |
| | | | 705/64 |
| 2017/0294130 A1* | 10/2017 | Donnelly | H04W 4/024 |
| 2023/0035873 A1* | 2/2023 | Lund | G06V 10/764 |
| 2024/0144836 A1* | 5/2024 | Chik | G06V 20/58 |

* cited by examiner though the online concierge system 140. To coordinate the delivery of user orders to the users, the online concierge system may coordinate communications between a user's device and the picker's device. For example, the user transmits a message to the picker about where to deliver ordered items, or a picker may transmit a question to the user asking questions about where to deliver items.

ESTABLISHING A COMMUNICATION SESSION USING A HANDSHAKE PROCESS WITH LIGHT SIGNALS

BACKGROUND

An online concierge system is an online system by which users can order items to be provided to them by a picker. To coordinate the delivery of user orders to the users, the online concierge system may coordinate communications between a user's device and the picker's device. For example, the user transmits a message to the picker about where to deliver ordered items, or a picker may transmit a question to the user asking questions about where to deliver items.

To ensure that the picker is delivering the correct ordered items to the correct user, the online concierge system may coordinate a handshaking process between the user's client device and the picker's client device. This handshaking process is a process by which devices authenticate each other and establish a communication session. For example, one of the devices may display a passcode (e.g., a PIN) for the user or picker to provide to the other. The other client device confirms, through the online concierge system, that the user who received the PIN entered the correct PIN, and if so, the devices establish a communication session between the two. Similarly, the devices may use a machine-readable label (e.g., a bar code or a QR code) to establish the communication session between the devices.

However, these handshaking processes require physical proximity in order to exchange a PIN or a machine-readable label, and users may be unable or unwilling to be physically close to others until they verify the other user through the handshaking process. For example, in the context of an online concierge system, a user may want to verify that a picker is delivering their order before retrieving their order from the picker. Similarly, in the context of a ride sharing system, a user may prefer to verify that a driver has been assigned to drive them to their destination before entering the driver's vehicle. Accordingly, it may be important to develop a handshake process that does not require such physical proximity.

SUMMARY

In accordance with one or more aspects of the disclosure, devices use a light signal to perform a handshaking process. A device uses a light emitter to generate a light signal that contains an encoded handshake identifier. This handshake identifier is an identifier generated by the device or by an online system and can be used to establish an out-of-band communication session with another device. Another device captures video data depicting the light signal and extracts the encoded handshake identifier from the depicted light signal. The other client device decodes the encoded handshake identifier and transmits the handshake identifier to an online system. If the handshake identifier matches the one transmitted by the first device, the online system establishes an out-of-band communication session between the two devices.

By using a light signal to transmit an encoded handshake identifier, devices can perform a handshaking process while at a distance from each other. This benefit is important in certain contexts, such as when a user wants to confirm the identity of a ride share driver before entering the vehicle or when a user wants to social distance from a picker delivering an order to the user. Additionally, a user can be sure that their device is performing the handshake process with the correct device because they can aim their camera such that they are capturing video data of the device that is emitting the light signal.

DETAILED DESCRIPTION

Figure 1:
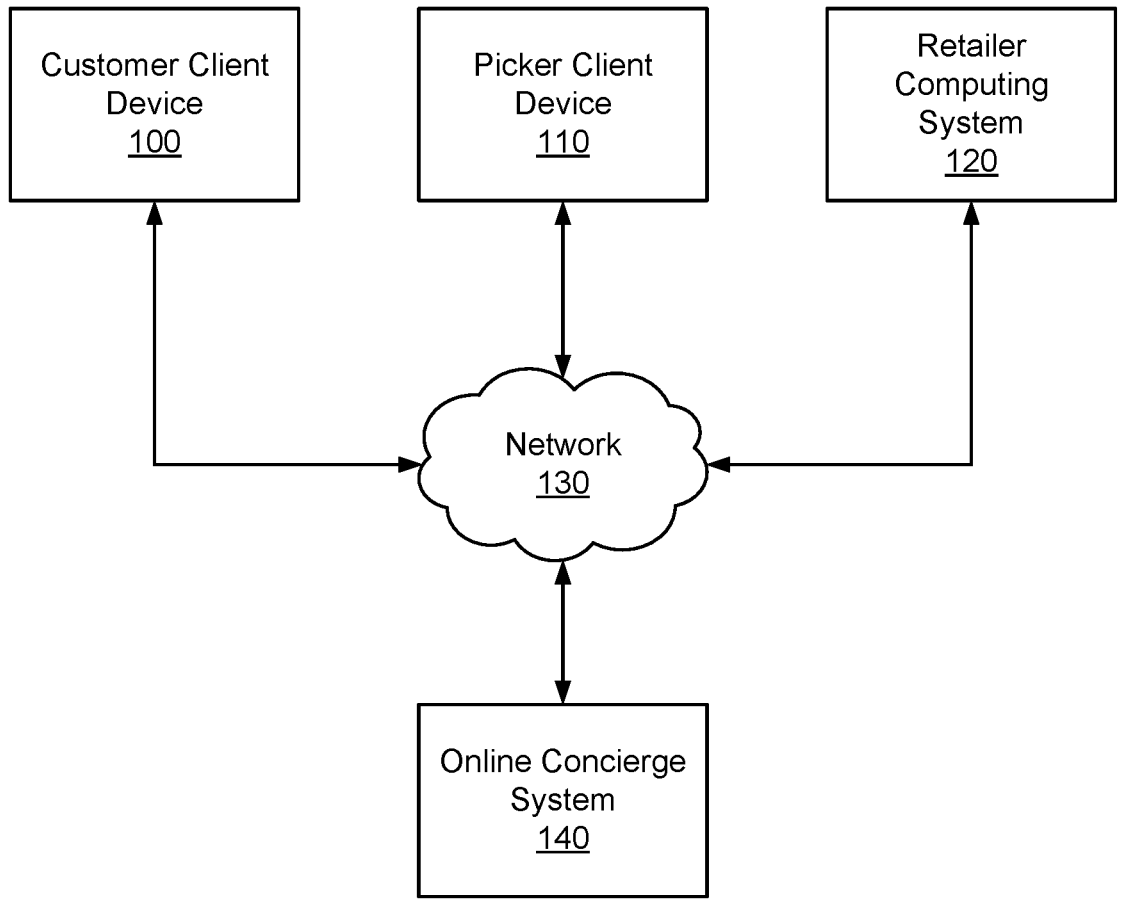
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
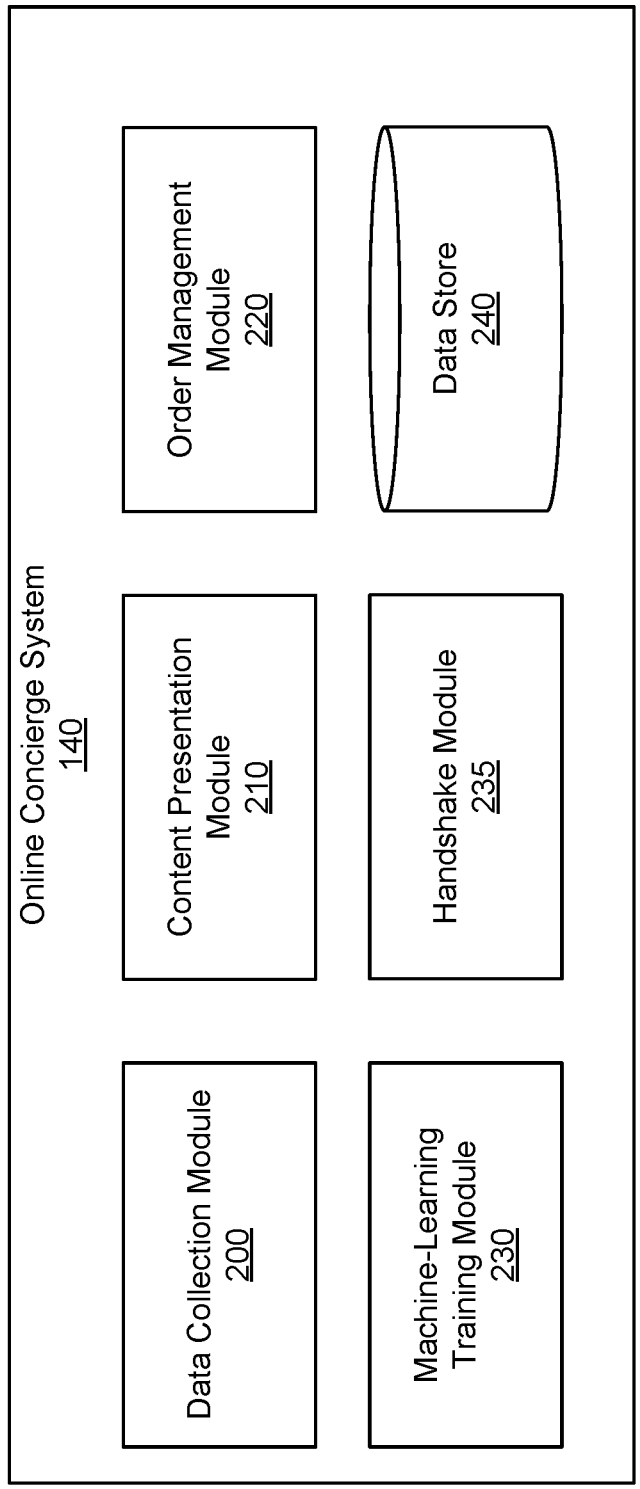
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The handshake module 235 coordinates handshaking processes between client devices. The handshake module 235 may generate a handshake identifier for a handshake process. In some embodiments, the handshake identifier is a unique number associated with an out-of-band communication session. The handshake module 235 may generate the handshake identifier in response to receiving a request from a device to establish an out-of-band communication session between that device and another device. The online concierge system 140 may direct input handshake identifiers captured by a device to the handshake module 235. The handshake module 235 matches the input handshake identifier against a generated handshake identifier. If the handshake identifier matches the generated handshake identifier, the handshake module 235 starts an out-of-band communication session between the devices. The handshaking process to establish an out-of-band communication session between devices is described in further detail below with regards to FIGS. 3A and 3B.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Example Light-Signal Based Handshake Process

Figure 3A:
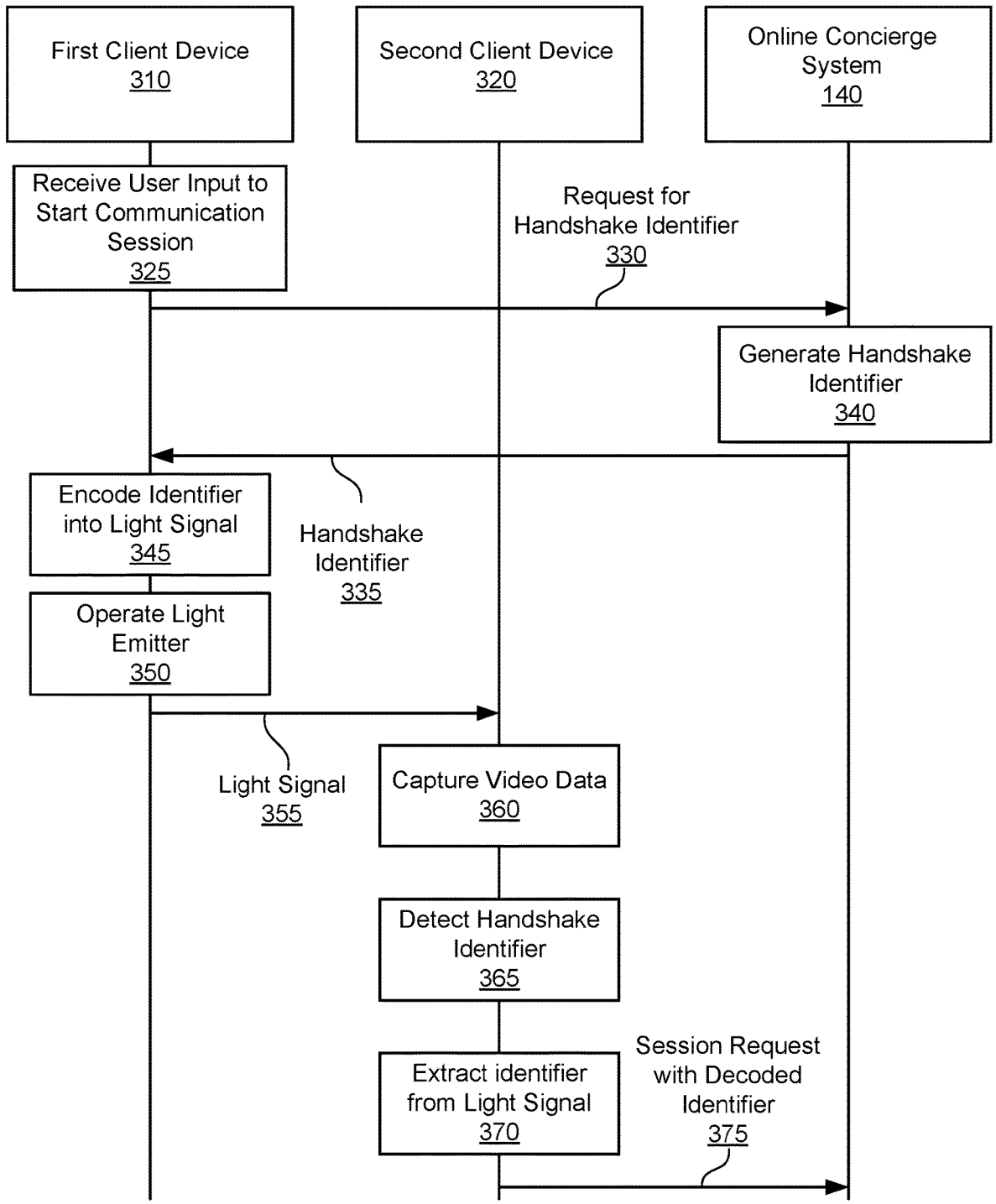
FIG. 3A depicts the interactions between devices and systems, in accordance with one or more embodiments.
Figure 3B:
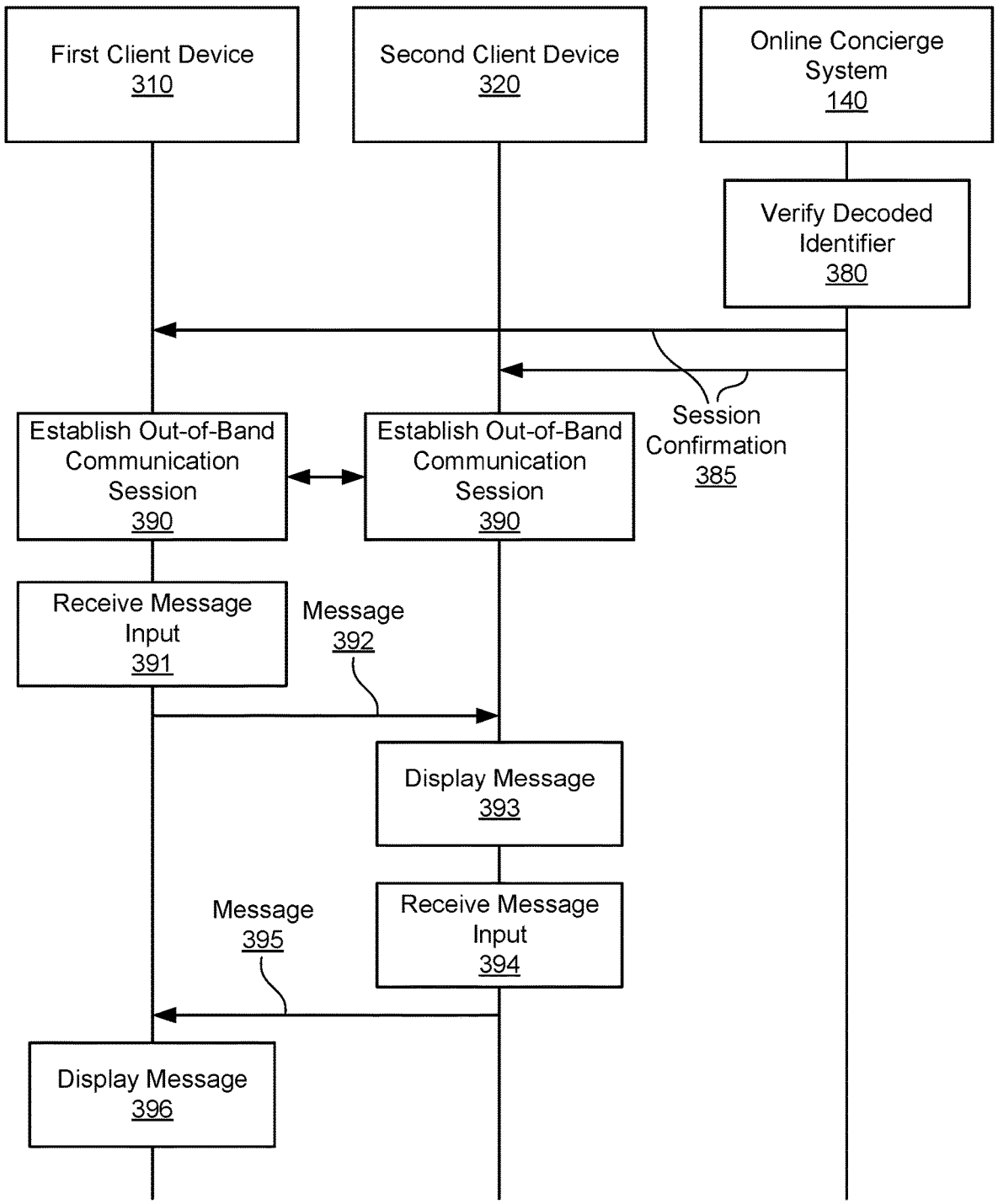
FIG. 3B is a continuation of the one or more embodiments depicted in FIG. 3A and depicts the interactions between devices in systems, in accordance with one or more embodiments.

FIGS. 3A and 3B are interaction diagrams illustrating how client devices interact with each other and an online concierge system to perform a light-signal based handshake process, in accordance with some embodiments. Alternative embodiments may include more, fewer, or different steps from those illustrated in FIG. 3A and FIG. 3B, and the steps may be performed in a different order from that illustrated in FIG. 3A and FIG. 3B.

FIG. 3A includes a first client device 310, a second client device 320, and an online concierge system 140. A customer uses the first client device 310 to interact with the online concierge system 140. A picker uses the second client device 320 to interact with the online concierge system 140. The customer may aim to communicate with the picker about a drop-off location or a request while maintaining a distance between the customer and the picker. To confirm that the customer is interacting with the correct picker, the customer and the picker use the first client device 310 and the second client device 320 respectively to perform a handshaking process.

The first client device 310 receives 325 a user input to start a communication session. The user input is an input from the user of the first client device 310 that represents an intent to establish a communication session with a separate device. For example, the first client device 310 may present a user interface element (e.g., a button) to a user and receive a user input when the user selects the user interface element of a client application.

The first client device 310 generates and transmits a request for a handshake identifier 330 to the online concierge system 140. A handshake identifier 335 is an identifier to be used by the first client device 310 to initiate an out-of-band communication session with another device. For example, the handshake identifier 335 may be a unique number to be assigned by the online concierge system 140 to the first client device 310 for establishing an out-of-band communication session.

The online concierge system 140 generates 340 a handshake identifier and transmits the handshake identifier 335 to the first client device 310. The first client device 310 encodes the handshake identifier 335 received from the online concierge system 140 into an encoded identifier. The first client device 310 encodes the handshake identifier by applying an encoding algorithm to the handshake identifier 345. For example, the first client device 310 may apply a binary encoding algorithm to the handshake identifier, such as Morse code encoding. Alternatively, the first client device 310 may apply an encoding algorithm that encodes the handshake identifier with non-binary values.

The first client device 310 operates 350 a light emitter coupled to the first client device 310 to transmit the encoded handshake identifier as a light signal 355. The light emitter is a component of the first client device that emits light. For example, the light emitter may be an LED light coupled to the first client device (e.g., a flashlight) or a display of the first client device 310. The first client device 310 operates 350 the light emitter by flashing the light emitter to create a light signal 355 that represents the encoded handshake identifier. For example, if the handshake identifier had been encoded using Morse code, the first client device 310 may turn the light emitter on and off to create the "dits" and "dahs" of the Morse-code-encoded handshake identifier. Similarly, if the handshake identifier had been encoded using a non-binary encoding algorithm, the first client device 310 may adjust the intensity of the light emitted by the light emitter to represent the values of the encoded handshake identifier. In some embodiments, the first client device 310 repeatedly transmits the light signal 355 until the connection is established. The first client device 310 may transmit the light signal 355 a user-defined or pre-determined number of times in response to a first client device 310 user pressing a button on a user interface.

The second client device 320 captures 360 video data depicting the light signal 355 emitted from the first client device 310. The second client device 320 captures the video data using a camera coupled to the second client device 320. The second client device 320 captures 360 video data in real-time. The second client device 320 may start capturing 360 video data in response to receiving a user input from the picker. For example, the second client device 320 may present a user interface (e.g., a button) and receive user input that instructs the second client device to capture 360 video data. Similarly, the second client device 320 may start capturing video data in response to instructions from the online concierge system 140. For example, the online concierge system 140 may instruct client devices near the first client device 310 to capture video data in response to receiving the handshake identifier request from the first client device. In some embodiments, the second client device 320 deletes captured video data after a time period, subject to privacy rules established by the customer or the picker or subject to retention policies of the online concierge system 140.

The second client device 320 detects 365 the light signal 355 in the captured video data. The second client device may detect 365 the light signal 355 by analyzing the pixels in the video data for a flashing light. For example, the second client device may identify pixels that have significant changes in values over relatively short periods of time to identify pixels that correspond to the light signal 355. The second client device 320 may present a reticule to a second client device 320 user indicating a guideline to position the light signal 355 from the first client device 310. The reticule allows the second client device to easily locate the light signal 355 within the reticule in video data by providing a location in the video data where the signal is positioned and may be detected.

Additionally, the second client device 320 may use a machine learning model to detect the light signal 355 in the video data. For example, the second client device 320 may use a machine learning model trained to predict a light signal 355 depicted in video data. In some embodiments, the second client device 320 uses multiple machine learning models to detect the light signal. For example, the second client device 320 may use a first machine learning model that is trained to predict whether video data depicts any light signal 355 or that is trained to generate a bounding box within the video data that is most likely to depict a light signal 355. The second client device may use a second machine learning model to predict the light signal 355 depicted in the video data based on the output of the first machine learning model.

The second client device 320 extracts 370 the handshake identifier from the detected light signal 355. The second client device 320 may extract the handshake identifier 335 by applying a decoding algorithm to the light signal. The decoding algorithm may correspond to the encoding algorithm used to encode the handshake identifier in the light signal 355. For example, if the handshake identifier was encoded using Morse code, the second client device 320 may decode the "dits" and "dahs" of the light signal 355 into the handshake identifier 335. Similarly, the second client device 320 may extract 370 the identifier from the light signal 355 using a machine learning model that has been trained to extract handshake identifiers 335 from video data depicting encoded light signals. The machine learning model may be trained on video data containing light signals encoded in the same encoding algorithm used to generate 340 the handshake identifier. In some embodiments, transmitting the light signal 355 has more than one machine learning models. A machine learning model may be used to identify that video captured by the second client device 320 has a light signal 355 in it. A second machine learning model may be used to determine the encoding language that the light signal 355 is encoded in. A third machine learning model may be used to translate the light signal 355 into a numerical or alphanumerical value of the identifier 335. For example, if the light signal 355 is encoded in Morse code, then the "dits" and "dahs would be translated by the third machine learning model into a numerical or alphanumerical value for the handshake identifier.

The second client device 320 transmits a session request 375 with the handshake identifier to the online concierge system 140. The session request 375 is a request to verify that the handshake identifier extracted by the second client device 320 matches the identifier sent by the first client device 310 to begin a communication session between the first client device 310 and the second client device 320. The second client device 320 may transmit a session request 375 after presenting a message to the picker that the light signal 355 was successfully captured and decoded.

FIG. 3B continues from FIG. 3A with the online concierge system 140 verifying 380 the decoded identifier. To verify the identifier, the online concierge system 140 matches the identifier from the second client device 320 with the generated handshake identifier 340. The online concierge system 140 compares the generated handshake identifier 335 with the decoded identifier from the light signal 355. If the identifier is a match, the online concierge system 140 transmits a session confirmation 385 to both client devices 310 and 320. If the identifier is not a match, the online concierge system 140 sends an error message to the second client device 320.

With the session confirmation received, the client devices 310 and 320 establish an out-of-band communication session 390. An out-of-band communication session 390 is a communication occurring through a different channel from the light signal. The two devices 310 and 320 begin communicating through a light signal 355 and captured video but switch to communicating through another channel. The out-of-band communication session 390 may be a WiFi connection, BLUETOOTH, or cellular data connection. In some embodiments, the out-of-band communication session 390 is a peer-to-peer network connection enabling direct communication between the two client devices. The out-of-band communication session 390 may be initiated through a cloud service provider. The cloud service provider may be a third-party company providing a cloud platform. The out-of-band communication session 390 may be terminated by either client device user through an application interface.

Once the session is confirmed through a session confirmation 385, each client device displays a session confirmation message on a user-interface stating that the session is initiated. The devices communicate with each other through the out-of-band communication session. The devices may use the out-of-band communication session to transmit messages to each other. To do so, the first client device 310 may receive input and transmit the message based on that input. The second client device 320 may display the message and receive its own input. The second client device 320 transmits a message based on that input to the first client device 310 and the first client device 310 displays it. The devices may transmit messages to each other in any order and one device may send multiple messages to the other before the other responds. These messages may be text input by the user or may be delivery locations. Additionally, the devices may use the out-of-band communication session to facilitate a voice call between the devices. Furthermore, these messages between the two client devices may be sent through the online concierge system 140.

While FIGS. 3A and 3B illustrate a particular embodiment, alternative embodiments are possible. For example, while the description for FIGS. 3A and 3B may primarily describe the first client device 310 as used by a customer and the second client device 320 as used by a picker, the described handshaking process may be used by any pair of users of the online concierge system to establish a communication session. For example, a customer may use the second client device 320 and a picker may use the first client device 310. Additionally, the described handshaking process may be used outside the context of an online concierge system by any devices to start an out-of-band communication session. In alternative embodiments, the online concierge system 140 generates and sends an encoded handshake identifier 355 to the first client device 310, and the first client device 310 transmits the encoded handshake identifier 335 to the second client device 320. Alternatively, the first client device 310 may generate 340 the handshake identifier 335 rather than the online concierge system 140 and transmit the handshake identifier 335 to the online concierge system 140 for the online concierge system to compare to the handshake identifier 335 generated by the first client device 310.

In some alternative embodiments, rather than the second client device 320 detecting, extracting, and decoding the handshake identifier from the light signal, these steps are performed by the online concierge system 140. For example, the second client device 320 may send video data to the online concierge system 140, for the online concierge system 140 to detect and extract the handshake identifier.

In another alternative embodiment, the second client device 320 flashes the encoded handshake identifier back to the first client device 310 as a confirmation. For example, the second client device 320 may have a camera frame rate that causes the second client device to incorrectly or incompletely capture the light signal from the first client device 310. In order to confirm that the correct signal is received, the second client device 320 flashes the signal back to the first client device 310. The first client device 310 checks that the received light signal matches the signal originally created. In some embodiments, if the two signals match, the first client device 310 communicates the match to the online concierge system 140 as verification for an out-of-band communication session.

In another alternative embodiment, the first client device 310 is used by a first picker and the second client device 320 is used by a second picker. The online concierge system assigns the first and second pickers to collect items for a set of orders from different zones in a retail location. For example, the online concierge system may assign the first picker to collect items from a frozen goods section and may assign the second picker to collect fresh foods and dry goods. The two pickers may use the method described above to establish an out-of-band communication session through exchanging a light signal. The communication session allows the pickers to communicate as they put together their orders.

Example Light Signal Exchange

Figure 4:
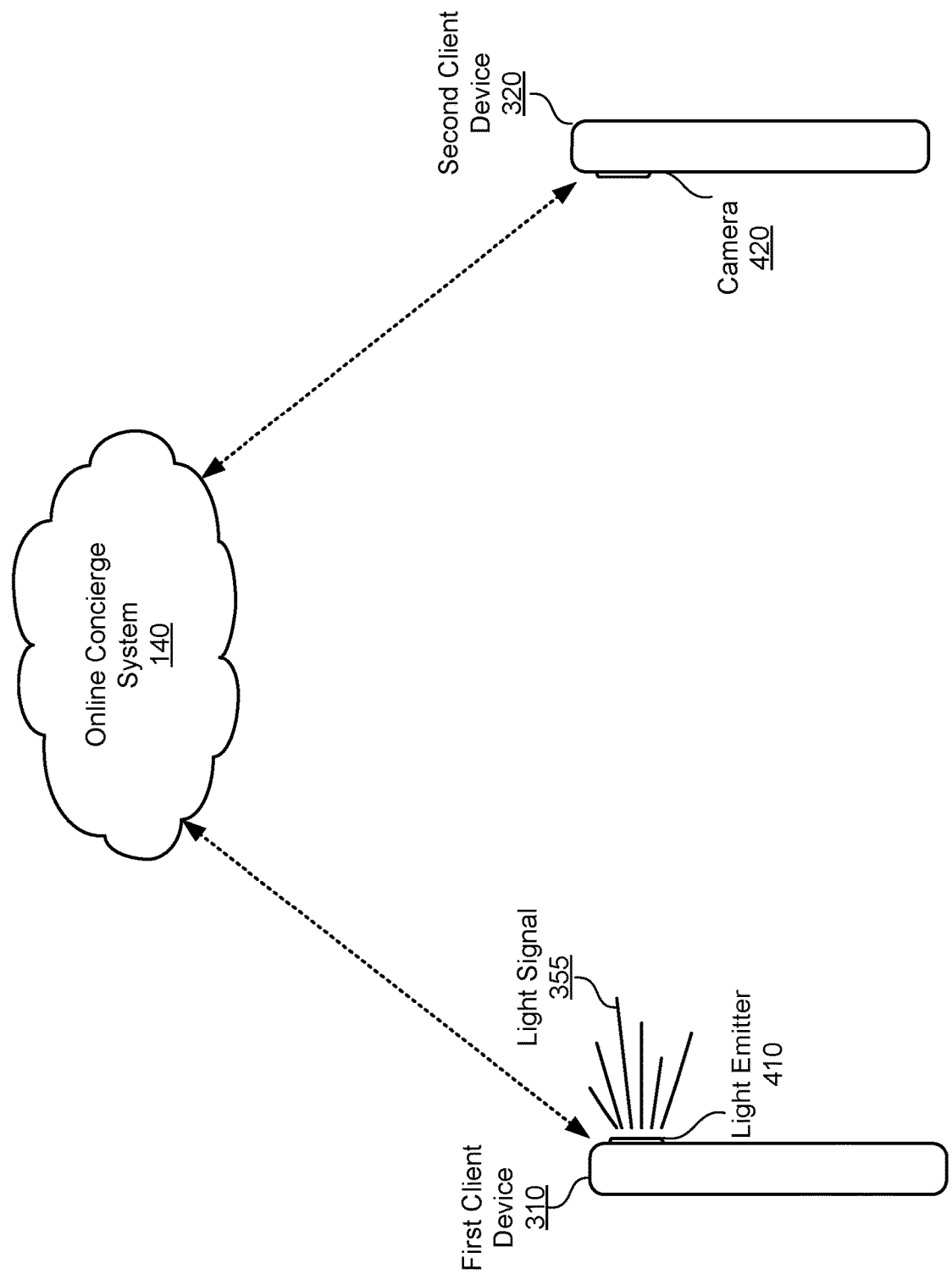
FIG. 4 illustrates the system environment, in accordance with one or more embodiments.

FIG. 4 illustrates a first client device and a second client device performing a handshaking process, in accordance with some embodiments. The first client device 310 uses a light emitter 410 to emit a light signal 355 at the second client device. The second client device 320 uses a camera 420 to capture video data of the emitted light signal and identify a handshake identifier encoded in the light signal.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
   capturing, by a camera of a first smartphone associated with a first user, video data depicting a light emitter of a second smartphone associated with a second user;
   detecting, in the video data by the processor, a light signal transmitted by the light emitter of the second smartphone, wherein detecting the light signal comprises applying a machine learning model to the captured video data, wherein the machine learning model is trained to detect a light signal depicted in video data;
   extracting, by the processor, a handshake identifier from the light signal by decoding the light signal;
   establishing, by the processor, a communication session with the second smartphone by transmitting a request to establish the communication session to an online system, wherein the request comprises the handshake identifier;
   receiving, through a user interface of the first smartphone, a text input by the first user, the text input describing a message from the first user to the second user; and
   transmitting, by the first smartphone, the text input to second smartphone via the communication session, wherein transmitting the text input to the second smartphone via the communication session causes the second smartphone to display the text input to the second user.

2. The method of claim 1, wherein capturing the video data comprises:
   receiving a user request via a client application operating on the first smartphone; and
   causing the camera of the first smartphone to capture the video data in response to receiving the user request.

3. The method of claim 1, wherein capturing the video data comprises:
   displaying the captured video data through on a display of the first smartphone; and
   displaying a reticule over the captured video data.

4. The method of claim 3, wherein detecting the light signal in the video data comprises:
   detecting the light signal within a portion of the video data within the reticule.

5. The method of claim 1, wherein extracting the handshake identifier from the light signal comprises:
   applying a machine learning model to the captured video data, wherein the machine learning model is trained to extract an encoded handshake identifier based on a light signal depicted in video data.

6. The method of claim 1, wherein decoding the light signal comprises:
   applying a decoding algorithm to the light signal that corresponds to an encoding algorithm used to encode the handshake identifier.

7. The method of claim 6, wherein the decoding algorithm is a Morse code decoding algorithm.

8. The method of claim 1, wherein establishing the communication session further comprises:
   transmitting the extracted handshake identifier to the online system.

9. The method of claim 1, wherein establishing the communication session comprises:
   initiating the communication session via a cloud service provider or via peer-to-peer networking.

10. The method of claim 1, wherein the first smartphone is associated with a picker and the second smartphone is associated with a customer, and wherein establishing the communication session comprises:
   sending, by the first smartphone, a message containing a confirmation of a delivery of an order by the picker to the customer.

11. The method of claim 1, wherein establishing the communication session further comprises:
   receiving a session confirmation message from the online system; and
   establishing the communication session based on the received session confirmation message.

12. A non-transitory computer-readable medium having instructions encoded thereon that, when executed by a processor, cause the processor to:
   capture, by a camera of a first smartphone associated with a first user, video data depicting a light emitter of a second smartphone associated with a second user;
   detect, in the video data, a light signal transmitted by the light emitter of the second smartphone, wherein detecting the light signal comprises applying a machine learning model to the captured video data, wherein the machine learning model is trained to detect a light signal depicted in video data;
   extract a handshake identifier from the light signal by decoding the light signal;
   establish a communication session with the second smartphone other client device by transmitting a request to establish the communication session to an online system, wherein the request comprises the handshake identifier;
   receive, through a user interface of the first smartphone, a text input by the first user, the text input describing a message from the first user to the second user; and
   transmit, by the first smartphone, the text input to second smartphone via the communication session, wherein transmitting the text input to the second smartphone via the communication session causes the second smartphone to display the text input to the second user.

13. The non-transitory computer-readable medium of claim 12, wherein the instructions for capturing the video data comprise instructions that, when executed by the processor, cause the processor to:
   receive a user request via a client application operating on the first smartphone; and
   cause the camera of the first smartphone to capture the video data in response to receiving the user request.

14. The non-transitory computer-readable medium of claim 12, wherein the instructions for capturing the video data comprise instructions that, when executed by the processor, cause the processor to:
   display the captured video data through on a display of the first smartphone; and
   display a reticule over the captured video data.

15. The non-transitory computer-readable medium of claim 12, wherein the instructions for extracting the handshake identifier from the light signal comprise instructions that, when executed by the processor, cause the processor to:
   apply a machine learning model to the captured video data, wherein the machine learning model is trained to extract an encoded handshake identifier based on a light signal depicted in video data.

16. The non-transitory computer-readable medium of claim 12, wherein the instructions for decoding the light signal comprise instructions that, when executed, cause the processor to:
   apply a decoding algorithm to the light signal that corresponds to an encoding algorithm used to encode the handshake identifier.

17. A system comprising:
   at least one processor;
   at least one non-transitory computer-readable medium storing instructions that, when executed by the at least one processor, cause the at least one processor to:
   capture, by a camera of a first smartphone associated with a first user, video data depicting a light emitter of a second smartphone associated with a second user;
   detect, in the video data, a light signal transmitted by the light emitter of the second smartphone, wherein detecting the light signal comprises applying a machine learning model to the captured video data, wherein the machine learning model is trained to detect a light signal depicted in video data;
   extract a handshake identifier from the light signal by decoding the light signal;
   establish a communication session with the second smartphone by transmitting a request to establish the communication session to an online system, wherein the request comprises the handshake identifier;
   receive, through a user interface of the first smartphone, a text input by the first user, the text input describing a message from the first user to the second user; and
   transmit, by the first smartphone, the text input to second smartphone via the communication session, wherein transmitting the text input to the second smartphone via the communication session causes the second smartphone to display the text input to the second user.

* * * * *